United States Patent
Lagnado

(10) Patent No.: US 9,414,330 B2
(45) Date of Patent: Aug. 9, 2016

(54) ADJUSTING A DUTY CYCLE OF WIRELESS TRANSMISSIONS

(75) Inventor: Isaac Lagnado, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/394,482

(22) PCT Filed: May 23, 2012

(86) PCT No.: PCT/US2012/039030
§ 371 (c)(1),
(2), (4) Date: Oct. 15, 2014

(87) PCT Pub. No.: WO2013/176658
PCT Pub. Date: Nov. 28, 2013

(65) Prior Publication Data
US 2015/0072721 A1    Mar. 12, 2015

(51) Int. Cl.
*H04W 52/02* (2009.01)
*H04B 17/00* (2015.01)
*H04W 52/28* (2009.01)
*H04W 76/04* (2009.01)
*H04B 17/10* (2015.01)
*H04W 88/02* (2009.01)

(52) U.S. Cl.
CPC ............ *H04W 52/28* (2013.01); *H04B 17/102* (2015.01); *H04W 76/048* (2013.01); *H04W 88/02* (2013.01); *Y02B 60/50* (2013.01)

(58) Field of Classification Search
CPC ............ H04W 52/0232; H04W 52/0251; H04W 52/28; H04W 52/36; H04B 10/564; H04B 17/102
See application file for complete search history.

(56) References Cited

U.S. PATENT DOCUMENTS

| | | | |
|---|---|---|---|
| 7,558,232 B2 | 7/2009 | Pearl | |
| 7,610,027 B2 | 10/2009 | Alapuranen | |
| 8,238,961 B2* | 8/2012 | Bychkov | H04B 1/3838 343/841 |
| 8,346,097 B1* | 1/2013 | Benzoni | H04B 10/25759 398/195 |
| 2002/0142791 A1 | 10/2002 | Tao et al. | |
| 2006/0067245 A1 | 3/2006 | Pearl | |
| 2007/0135058 A1* | 6/2007 | Ma | H04W 52/225 455/69 |
| 2008/0232436 A1 | 9/2008 | Schwartz et al. | |
| 2009/0305742 A1* | 12/2009 | Caballero | H04B 1/3838 455/566 |
| 2012/0021707 A1* | 1/2012 | Forrester | H04W 52/281 455/103 |
| 2012/0208601 A1* | 8/2012 | Lockwood | H04W 52/0254 455/566 |
| 2012/0315847 A1* | 12/2012 | Li | H03K 17/975 455/41.1 |
| 2013/0057078 A1* | 3/2013 | Lee | H02J 7/00 307/104 |
| 2013/0084837 A1* | 4/2013 | Nunally | G06Q 50/01 455/414.1 |

OTHER PUBLICATIONS

International Search Report and Written Opinion received in PCT Application No. PCT/US2012/039030, mailed Jan. 23, 2013, pp. 9.

* cited by examiner

*Primary Examiner* — Andrew Wendell
(74) *Attorney, Agent, or Firm* — Trop, Pruner & Hu

(57) ABSTRACT

A duty cycle of wireless transmissions of the electronic device is adjusted based on wireless transmission activity. The adjusting considers the electronic device to be idle if the electronic device wirelessly transmits at a power level less than a non-zero power threshold.

19 Claims, 4 Drawing Sheets

ADJUSTING A DUTY CYCLE OF WIRELESS TRANSMISSIONS

CROSS-REFERENCE TO RELATED APPLICATION

This application is a national stage application under 35 U.S.C. §371 of PCT/US2012/039030, filed May 23, 2012.

BACKGROUND

Various electronic devices can communicate wirelessly. Examples of such electronic devices include mobile telephones, personal digital assistants, smart phones, tablet computers, notebook computers, and so forth. Wireless communications can be accomplished by use of a wireless communications module of an electronic device. The wireless communications module is able to transmit wireless signals and receive wireless signals.

BRIEF DESCRIPTION OF THE DRAWINGS

Some embodiments are described with respect to the following figures.

DETAILED DESCRIPTION

When an electronic device capable of wireless communications is used in relatively close proximity to a user, the user can be exposed to some amount of electromagnetic (EM) radiation. To protect users from excessive exposure to EM radiation, government regulatory agencies have set radiation-related thresholds. The wireless transmissions of an electronic device are controlled such that they do not exceed the radiation-related thresholds. An example of a radiation-related threshold is a specific absorption rate (SAR), which refers to a measure of rate at which energy is absorbed by the human body when exposed to EM radiation. SAR can be expressed as power absorbed per mass of tissue (e.g. watts per gram). A government agency can specify a maximum SAR that electronic devices have to satisfy. Other types of radiation-related thresholds can include an effective radiated power (ERP) threshold, a maximum permissible exposure (MPE) time threshold, and so forth.

With some example techniques, the transmission power of a wireless communications module of an electronic device can be reduced to satisfy a radiation-related threshold. However, reducing transmission power of a wireless communications module of an electronic device can result in reduced communications performance of the electronic device. For example, signals having reduced transmission power can be more likely to be subjected to interference from other signals, which can reduce the likelihood of successful receipt of the transmitted signals by a receiving device. Also transmitting signals at a lower power can also reduce the range of the transmitted signals.

Figure 1:
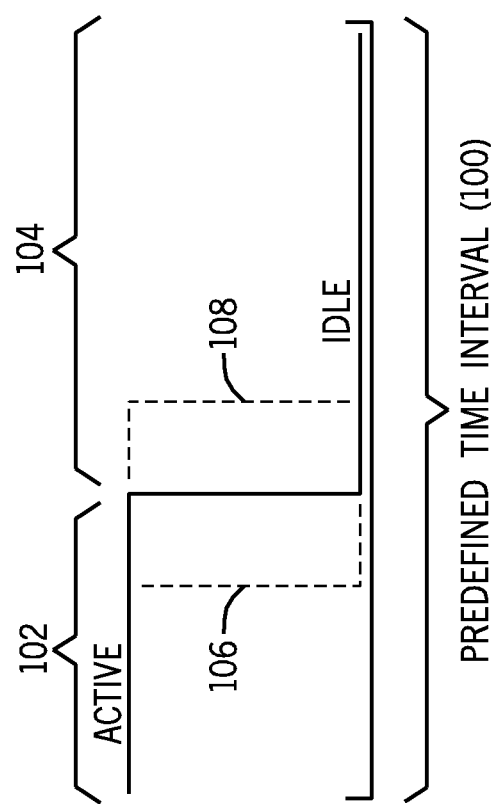
FIG. 1 illustrates example duty cycles of wireless transmissions that can be adjustable according to some implementations.

Instead of adjusting the transmission power of a wireless communications module of an electronic device to satisfy a radiation-related threshold, techniques or mechanisms according to some implementations allow for a duty cycle of wireless transmissions to be adjusted. As shown in FIG. 1, for example, the "duty cycle" of wireless transmissions can refer to a measure of an amount of time (102) that the electronic device is active (in wirelessly transmitting signals) relative to an amount of time (104) that the electronic device is idle (in wirelessly transmitting signals), within a predefined time interval (100). The predefined time interval (100) can be of any predefined length of time. As an example, the predefined time interval (100) can be the time interval associated with SAR measurements (e.g. 6 minutes). In other examples, other predefined time intervals can be used.

Within the predefined time interval (100), increasing the amount of time that the electronic device is idle (see dashed line 106, for example) can reduce the exposure of a user to EM radiation. As a result, if it is determined, based on monitored wireless transmission activity of the electronic device during a given time interval, that a radiation-related threshold may be violated, then techniques or mechanisms according to some implementations are able to reduce the duty cycle of wireless transmissions, which increases the amount of time in the predefined time interval (100) that the electronic device is idle (in wirelessly transmitting signals).

Monitoring the wireless transmission activity for the purpose of adjusting the duty cycle of wireless transmissions can involve monitoring, in a given time interval, signal transmission of an electronic device, along with corresponding power levels of the signal transmissions. The "given time interval" can be the same as the predefined time interval 100 depicted in FIG. 1, or alternatively, the "given time interval" can refer to a different time interval (of smaller or larger duration than the predefined time interval 100). The amount of signal transmissions, along with their respective power levels, can be used for estimating radiation exposure of a user of the electronic device. Thus, based on the monitored wireless transmission activity, the duty cycle of wireless transmissions can be adjusted to ensure that the estimated radiation exposure satisfies a radiation-related threshold.

Although reducing the duty cycle of wireless transmissions can reduce the total communications throughput of the electronic device in the uplink direction (from the electronic device to the network), reducing the duty cycle of wireless transmissions does not affect the power level of signal transmissions from the electronic device. As a result, issues associated with reducing power levels of transmitted signals (such as increased interference, or reduced likelihood of successful receipt of the transmitted signals, or reduced range) can be avoided.

If the electronic device determines, based on monitored wireless activity of the electronic device during a given time interval, that the wireless transmissions of the electronic device result in EM radiation exposure that is well below a radiation-related threshold, then the electronic device can increase the duty cycle of wireless transmissions. Increasing the duty cycle of wireless transmissions refers to increasing the amount of time that the electronic device is active (in wirelessly transmitting signals) relative to the amount of time that the electronic device is idle (see dashed line 108 in FIG. 1, for example).

In some examples, an electronic device being idle (in wirelessly transmitting signals) does not mean that the electronic device is not transmitting signals at all. Rather, idle can be defined as either the electronic device not wirelessly transmitting signals at all, or alternatively, the electronic device wirelessly transmitting signals at a power level less than some predefined power threshold. Similarly, the electronic device being active (in wirelessly transmitting signals) can refer to the electronic device wirelessly transmitting signals at a power level that exceeds the predefined power threshold. The "predefined power threshold" can be a zero power threshold, or alternatively, a non-zero power threshold.

Figure 2:
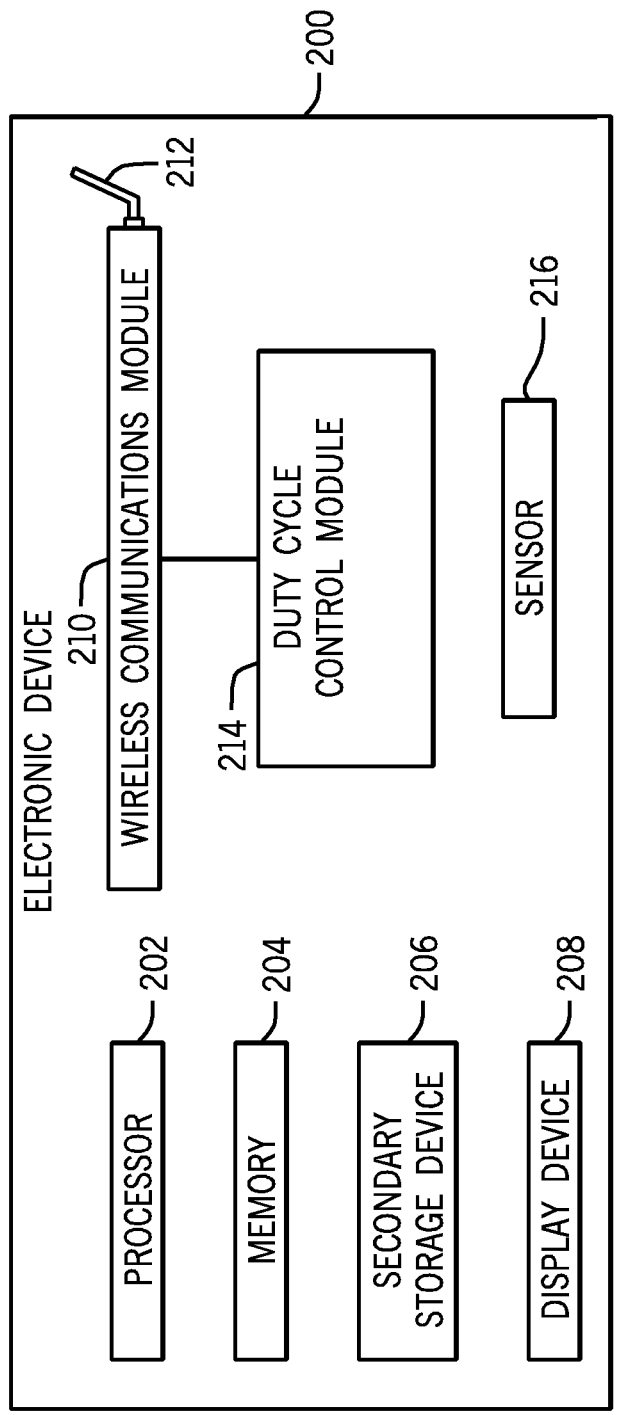
FIG. 2 is a block diagram of an example electronic device according to some implementations.

FIG. 2 is a block diagram of an example arrangement of an electronic device 200 (which can be a mobile telephone, a smart phone, a personal digital assistant, a tablet computer, a notebook computer, etc.). In the example of FIG. 2, the electronic device 200 includes a processor (or multiple processors) 202, a memory 204, a secondary storage device 206, and a display device 208. The memory 204 and/or secondary storage device 206 can store machine-readable instructions that are executable by the processor(s) 202. A processor can include a microprocessor, a microcontroller, a processor module or subsystem, a programmable integrated circuit, a programmable gate array, or another control or computing device.

The electronic device 200 also includes a wireless communications module 210, which has an antenna 212 to allow for transmission and receipt of wireless signals. The wireless communications module 210 can include a transceiver for transmitting and receiving signals.

In accordance with some implementations, the electronic device 200 also includes a duty cycle control module 214, which can be used to adjust the duty cycle of wireless transmissions according to some implementations.

In some examples, the electronic device 200 can also include a sensor 216 to detect at least one physical characteristic associated with the electronic device 100. The at least one physical characteristic can include proximity of the electronic device 100 to a user, such as to a user's hand, the user's face, or another body part of the user. In such an example, the sensor 216 is a proximity sensor. The electronic device 200 is determined to be in the proximity of the user if the proximity sensor 216 determines that a part of the user is within some predefined distance of the electronic device 200. The proximity sensor 216 can be capacitive sensor, which capacitively provides an indication of proximity when the electronic device 200 is within the predefined distance of the part of the user. Alternatively, the proximity sensor 216 can be an optical sensor (e.g. a light sensor), that is able to detect proximity based on transmitting an optical signal and detecting whether the optical signal is reflected from a part of the user that is in the proximity of the electronic device 200. In other examples, other types of proximity sensors can be used.

In other examples, the physical characteristic can be an orientation of the electronic device 200. In such examples, the sensor 216 is an orientation sensor. The orientation sensor 216 can be an accelerometer or other type of sensor that can detect whether the electronic device 200 is in a landscape orientation (the main surface, such as the surface containing the display, being generally horizontal to the ground, for example), in a portrait orientation, or in some other orientation. The different orientations of the electronic device 200 can result in different distances between the antenna 212 and a part of the user.

Output from the sensor 216 can be used by the duty cycle control module 214 to trigger performance of a duty cycle adjustment process.

The duty cycle control module 214 can be implemented in hardware, implemented as machine-readable instructions executable on the processor(s) 202, or implemented as a combination of hardware and machine-readable instructions. In examples where the duty cycle control module 214 is implemented at least in part with machine-readable instructions, these machine-readable instructions can be in the form of software executable on the processor(s) 202, or software or firmware executable by a processor in the wireless communications module 210.

Figure 3:
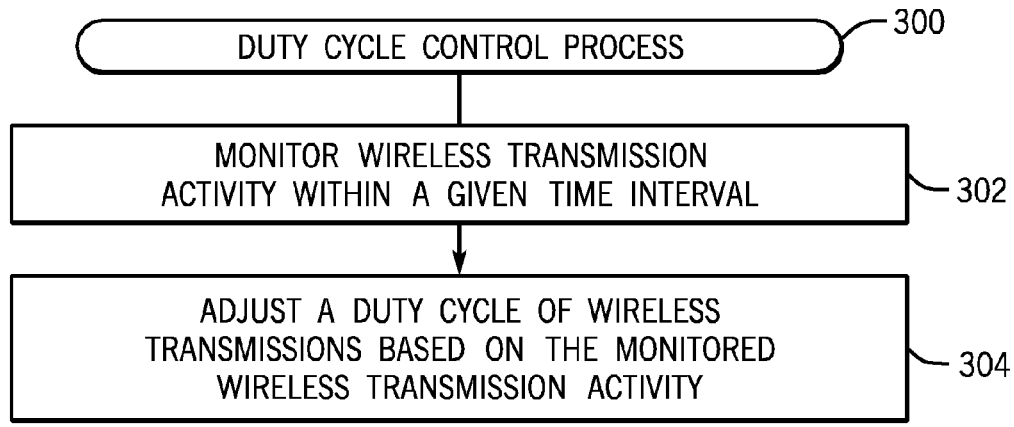
FIGS. 3-5 are flow diagrams of duty cycle control processes according to various implementations.
Figure 4:
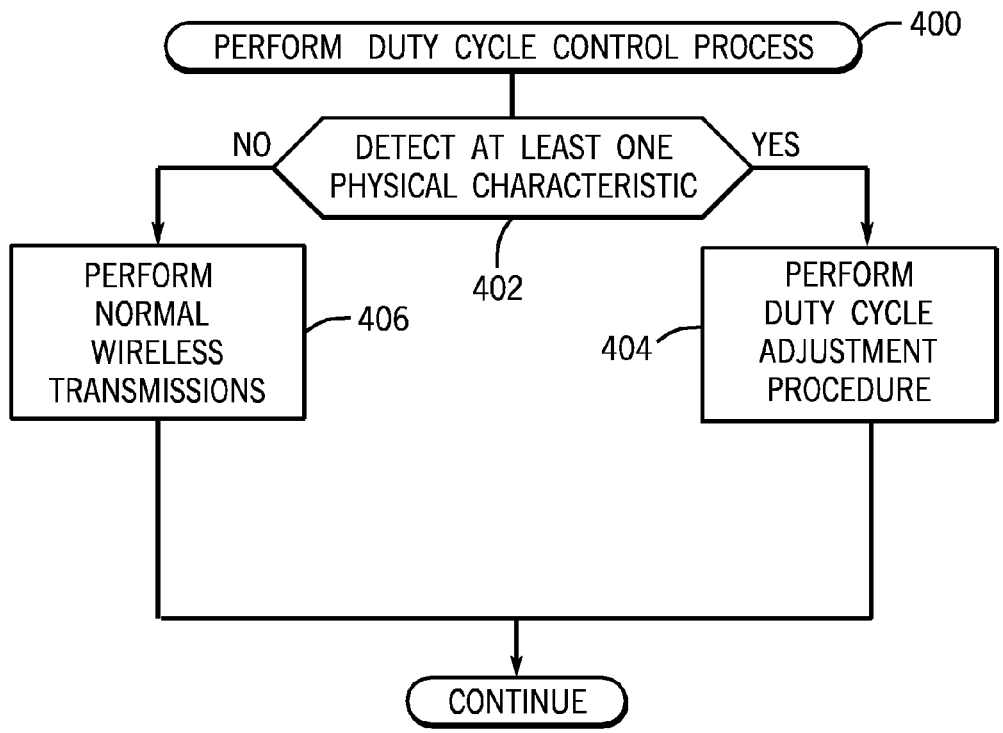
Figure 5:
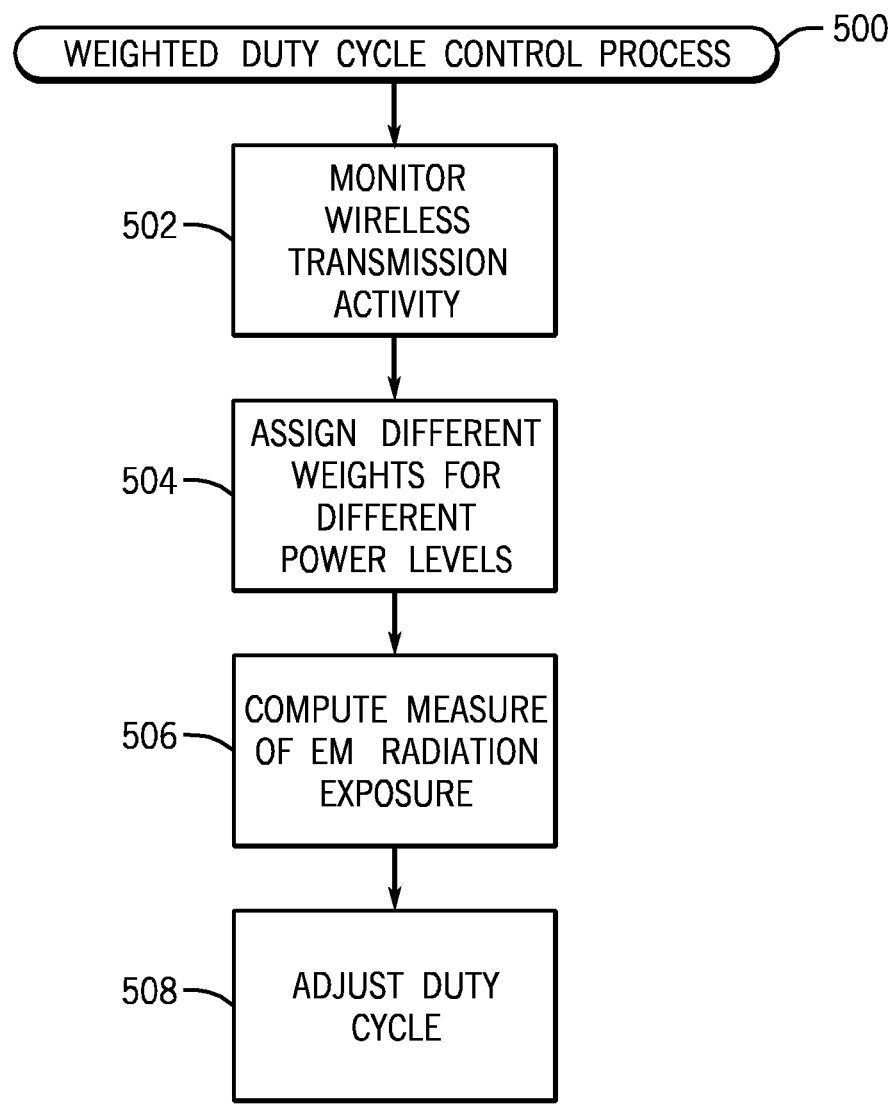

The duty cycle control module 214 according to some implementations can perform a duty cycle control process 300, 400, or 500 according to FIG. 3,4, or 5, respectively. In the process 300 of FIG. 3, the duty cycle control module 214 monitors (at 302) wireless transmission activity of the electronic device 100 during a given time interval, which can be the predefined time interval 100 of FIG. 1, or some other time interval Monitoring the wireless transmission activity can refer to monitoring the wireless communication module 210 to determine when the wireless communications module 210 is actively transmitting wireless signals at power levels above a predefined power threshold.

In some implementations, the wireless communications module 210 is considered to be idle if the wireless communications module 210 is not transmitting wireless signals, or if the wireless communications module 210 is transmitting wireless signals at any power level that is less than the predefined power threshold. Wireless transmissions at power levels below the predefined power threshold can be considered to not contribute substantially to EM radiation exposure of a user. Thus, even though the electronic device 200 may be wirelessly transmitting, such wireless transmissions (at power levels less than the predefined power threshold) can be disregarded (for the purpose of determining whether EM radiation exposure of a user exceeds a radiation-related threshold).

The duty cycle control module 214 next adjusts (at 304) a duty cycle of wireless transmissions of the electronic device based on the monitored wireless transmission activity. The adjusting (at 304) considers the electronic device 200 to be idle if the electronic device 200 wirelessly transmits at a power level less than a non-zero power threshold to be an idle activity.

Adjusting the duty cycle can be accomplished by setting a duty cycle parameter, which can be stored in the memory 204 or secondary storage device 206 of FIG. 2, or in a storage medium in the wireless communications module 210. The wireless communications module 210 is able to retrieve this duty cycle parameter to determine the duty cycle at which the wireless communications module 210 is to transmit within a predefined time interval.

The duty cycle control module 214 is able to compute a measure of the EM radiation exposure of a user based on the monitored wireless transmission activity. The measure of EM radiation exposure of a user is based on a power level (or power levels) of wireless transmissions in the monitored wireless transmission activity, in combination with respective amounts of time at which the wireless transmissions occurred. Alternatively, in certain implementation (such as in implementations where the duty cycle control module 214 is implemented as software executable on the processor(s) 202), the duty cycle control module 214 may not have access to output power levels. In such implementations, a received signal strength can be utilized to estimate signal power in the transmit direction. Such estimation can use a table or other data structure that maps signal strengths to corresponding power levels, for example. The measure of EM radiation exposure of a user is proportional to the product of the power level of transmission and the amount of time at which transmission occurred at the corresponding power level:

$$\text{EM Radiation Exposure} \propto \text{Power\_Level} \times \text{Time},$$

where Power_Level represents a power level of wireless transmission (either actual or estimated based on the received signal strength), Time represents an amount of time at which wireless transmission occurred at the power level, and the operator "∝" indicates that the EM radiation exposure is proportional to the product of Power_Level and Time.

Based on the measure of EM radiation exposure, the duty cycle control module 214 can determine whether a radiation-related threshold (e.g. SAR or some other threshold) would be violated. If so, the duty cycle control module 214 can reduce the duty cycle of wireless transmissions. On the other hand, if the duty cycle control module 214 determines that the computed measure EM radiation exposure is well within the radiation-related threshold, then the duty cycle control module 214 can increase the duty cycle of wireless transmissions.

FIG. 4 shows a duty cycle control process 400 according to alternative implementations. In the process of FIG. 4, the duty cycle control module 214 determines (at 402), based on an output from the sensor 216 of FIG. 2, whether at least one physical characteristic associated with the electronic device has been detected. As noted above, such physical characteristic can include proximity to a user, an orientation of the electronic device, or some other physical characteristic.

In response to detecting the at least one physical characteristic, the duty cycle control module 214 triggers performance (at 404) of a duty cycle adjustment procedure. On the other hand, if the at least one physical characteristic is not detected (at 402), then regular wireless transmissions are performed (at 406), where duty cycle adjustment is not performed.

In some examples, the "regular" wireless transmissions (406) can allow for full power transmission (by disabling the duty cycle control module 214 of FIG. 2) to occur anytime a proximity sensor detects a user is outside of its range. Subsequently, if a proximity sensor detects a user within range, then the electronic device 200 can activate the duty cycle control module 214 to safeguard a user from EM radiation exposure.

The duty cycle adjustment procedure 404 of FIG. 4 can include the duty cycle control process 300 of FIG. 3 in some examples. In alternative examples, the duty cycle adjustment procedure 404 can include a weighted duty cycle control process 500, as depicted in FIG. 5.

The weighted duty cycle control process 500 of FIG. 5 includes monitoring (at 502) wireless transmission activity that can involve wireless transmissions at multiple power levels. For example, the electronic device 200 can transmit data units at corresponding multiple power levels within a given time interval. The weighted duty cycle control process 500 can assign (at 504) different weights to data units transmitted at corresponding different power levels. The different weights that are assigned to the data units for corresponding different power levels can include a larger weight for a data unit transmitted at a higher power level and a lower weight for a data unit transmitted at a lower power level. The notion here is that higher power levels can cause higher radiation exposure of the user, and thus a larger weight is assigned to account for such potentially larger radiation exposure. A measure of the EM radiation exposure of a user due to data units transmitted at corresponding different power levels can be computed (at 506) based on the following formula:

$$\text{EM Radiation Exposure} \propto w_1 \cdot t_1 + w_2 \cdot t_2 + \ldots + w_n \cdot t_n,$$

where $w_i$ (i=1 to n, where n≥2) represents a weight to be assigned based on the corresponding power level of transmission, and $t_i$ represents an amount of time during which transmission at the respective power level occurred.

The weighted duty cycle control process 500 adjusts (at 508) a duty cycle of wireless transmissions of the electronic device based on the computed measure of EM radiation exposure.

In addition, depending on a physical characteristic associated with the electronic device 200, such as its orientation, different weightings can be applied to each power level based on the physical characteristic. For example, if the electronic device 200 is held in the portrait orientation, the transmitting antenna 214 may be a different distance away from user's body then if the electronic device 200 were held in the landscape orientation. Since each orientation may be associated with a different EM radiation-related threshold, the weighting for each associated power level can be different. The weighting applied to a power level when the orientation of the electronic device 200 causes its antenna 214 to be closer to the user's body may be higher than the weighting of the same power level associated with another orientation in which the antenna 214 may be farther away from the user.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   detecting, by an electronic device comprising a processor, at least one physical characteristic associated with the electronic device, the at least one physical characteristic comprising proximity of the electronic device to a user;
   monitoring, by the electronic device, wireless transmission activity of an electronic device during a given time interval;
   computing, by the electronic device, a measure of radiation exposure based on the monitored wireless transmission activity;
   determining, based on the computed measure of radiation exposure, whether a radiation-related threshold will be violated; and
   in response to detecting the at least one physical characteristic comprising the proximity of the electronic device to the user, adjusting, by the electronic device, a duty cycle of wireless transmissions of the electronic device based on the monitored wireless transmission activity and determining that the radiation-related threshold will be violated, where the adjusting considers the electronic device to be idle if the electronic device wirelessly transmits at a power level less than a non-zero power threshold.

2. The method of claim 1, wherein computing the measure is based on a power level of a given wireless transmission and a time duration of the given wireless transmission.

3. The method of claim 1, wherein adjusting the duty cycle of wireless transmissions comprises varying an amount of time of active wireless transmissions relative to an amount of time of the electronic device being idle, within a predefined time interval.

4. The method of claim 1, wherein the at least one physical characteristic further comprises an orientation of the electronic device.

5. The method of claim 1, wherein computing the measure of radiation exposure is based on determining when the electronic device is actively transmitting wireless signals at a power level above the non-zero power threshold, wherein computing the measure of radiation exposure does not consider transmissions of wireless signals at a non-zero power level less than the non-zero power threshold.

6. The method of claim 1, wherein the proximity of the electronic device to the user comprises the electronic device being within a predefined distance from the user.

7. The method of claim 1, wherein computing the measure of radiation exposure is based on assigning different weights to different transmitted data units, the different weights comprising a first weight assigned to a first data unit of the different transmitted data units responsive to the electronic device being in a first orientation, and a second, different weight assigned to a second data unit of the different transmitted data units responsive to the electronic device being in a second, different orientation.

8. An electronic device comprising:
a sensor to detect a physical characteristic associated with the electronic device, the physical characteristic comprising a proximity of the electronic device to a user; and
at least one processor to:
compute a measure of radiation exposure based on monitored wireless transmission activity of the electronic device;
determine, based on the computed measure of radiation exposure, whether a radiation-related threshold will be violated; and
in response to detecting the physical characteristic comprising the proximity of the electronic device to the user, trigger performance of a duty cycle adjustment procedure that adjusts a duty cycle of wireless transmissions from the electronic device based on determining that the radiation-related threshold will be violated.

9. The electronic device of claim 8, wherein the detected physical characteristic further includes an orientation of the electronic device.

10. The electronic device of claim 8, wherein adjusting the duty cycle includes varying an amount of time the electronic device is active in wireless transmission relative to an amount of time the electronic device is idle, in a predefined time interval.

11. The electronic device of claim 8, wherein the duty cycle adjustment procedure comprises assigning different weights to data units transmitted at corresponding different power levels,
where adjusting the duty cycle of wireless transmissions from the electronic device is based on the weights.

12. The electronic device of claim 11, wherein the duty cycle adjustment procedure further includes monitoring the wireless transmission activity of the electronic device within a given time interval, wherein the data units are included in the wireless transmission activity.

13. The electronic device of claim 11, wherein the at least one processor is to further compute the measure of radiation exposure based on the assigned weights.

14. The electronic device of claim 8, wherein the at least one processor is to disable the duty cycle adjustment procedure in response to detecting that the electronic device is not in the proximity to the user.

15. The electronic device of claim 14, wherein the proximity of the electronic device to the user comprises the electronic device being within a predefined distance from the user, and the detecting is based on an output of a proximity sensor.

16. The electronic device of claim 8, wherein the computing of the measure of radiation exposure is based on assigning different weights to different transmitted data units, the different weights comprising a first weight assigned to a first data unit of the different transmitted data units responsive to the electronic device being in a first orientation, and a second, different weight assigned to a second data unit of the different transmitted data units responsive to the electronic device being in a second, different orientation.

17. An article comprising at least one non-transitory machine readable storage medium storing instructions that upon execution cause an electronic device to:
detect a proximity of the electronic device to a user;
monitor wireless transmission activity of the electronic device during a given time interval;
compute a measure of radiation exposure based on the monitored wireless transmission activity of the electronic device;
determine, based on the computed measure of radiation exposure, whether a radiation-related threshold will be violated; and
in response to detecting the proximity of the electronic device to the user, reduce a duty cycle of wireless transmissions of the electronic device based on determining that the radiation-related threshold will be violated, where the adjusting considers the electronic device to be idle if the electronic device wirelessly transmits at a non-zero power level less than a non-zero power threshold.

18. The article of claim 17, wherein the proximity of the electronic device to the user comprises the electronic device being within a predefined distance from the user, and the detecting is based on an output of a proximity sensor.

19. The article of claim 17, wherein computing the measure of radiation exposure is based on assigning different weights to different transmitted data units, the different weights comprising a first weight assigned to a first data unit of the different transmitted data units responsive to the electronic device being in a first orientation, and a second, different weight assigned to a second data unit of the different transmitted data units responsive to the electronic device being in a second, different orientation.

* * * * *